United States Patent [19]
Canterino et al.

[11] 4,258,166
[45] Mar. 24, 1981

[54] LOW DENSITY POLYETHYLENE FILM

[75] Inventors: Peter J. Canterino, Towaco; Craig E. Allen, Clark, both of N.J.

[73] Assignee: Mobil Oil Corporation, Fairfax, Va.

[21] Appl. No.: 46,750

[22] Filed: Jun. 8, 1979

[51] Int. Cl.³ .............................................. C08F 10/02
[52] U.S. Cl. ................................ 526/348.1; 526/317; 526/329; 526/331
[58] Field of Search ...................... 526/348.1, 329, 331, 526/317

[56] References Cited
U.S. PATENT DOCUMENTS 3,558,580  1/1971  Orser ................................. 526/348.1

Primary Examiner—Stanford M. Levin
Attorney, Agent, or Firm—C. A. Huggett; R. J. Cier

[57] ABSTRACT

There is disclosed herein a uniaxially oriented plastic film material having improved strength and clarity in the direction of orientation with unexpected improvement in strength in the transverse (unoriented) direction. Preferred film materials of homopolymers and copolymers of ethylene having a density of 0.915 to 0.935 g/cm³.

4 Claims, No Drawings

LOW DENSITY POLYETHYLENE FILM

BACKGROUND OF THE INVENTION

Field of the Invention

This invention relates to the film-forming arts and is particularly concerned with the strengthening of plastic film material by stretching subsequent to extrusion.

Background of the Invention

Orientation is a process whereby a plastic film or sheet is stretched in such a way as to orient the polymeric chains of the plastic parallel to the plane of the film but more or less randomly within this plane. Biaxial, or planar, orientation occurs when a film or sheet is drawn in more than one direction, commonly along two axes at right angles to one another. The tensile strength and elastic modulus are increased in the directions of pull and decreased in the direction perpendicular to the direction of the pull. Uniaxial orientation, or stretching in only one direction, is normally employed in the formation of filaments and takes place during the drawing operation. Here the polymer chains are aligned in a single dimension, as in a sheaf. This produces maximum strength in one direction, i.e., the direction of orientation. However, although uniaxial orientation is desirable in a fiber, it has been commonly found that a uniaxially oriented sheet of film material will tend to crack and split along lines parallel to the direction of stretching. Also, while stretching a film of crystalline or partially crystalline polymeric material in one direction will generally improve the properties in that direction, it has been found that these same properties, e.g. strength, clarity, etc., will normally deteriorate in the direction at right angles to the direction of stretch.

SUMMARY OF THE INVENTION

We have now discovered that, with respect to polyethylene film, if the degree of crystallinity is controlled to keep the density of the polymer within the approximate range of 0.915 to 0.935 g/cm$^3$, the film may be uniaxially oriented to give an improved product which does not exhibit the undesirable degradation of properties in the transverse direction. Such a film, conventionally referred to as low density polyethylene (LDPE), may be stretched in a single direction, at temperatures below its crystalline melting point, to improve the film strength and clarity in that direction while simultaneously achieving unexpected improvement in tear strength in the transverse direction.

DESCRIPTION OF SPECIFIC EMBODIMENTS

The polyethylene films to which our invention is applicable are low density polyethylene (LDPE) films or sheets produced by well-known film-forming techniques—e.g. extrusion, casting and so forth—from readily available polymer resins. Such resins may be conventional ethylene homopolymers or copolymers of ethylene with other unsaturated monomers. Preferred unsaturated monomers for copolymerization with ethylene comprise acrylic acid, esters of acrylic acid, vinyl acetates or other vinyl esters, and olefinic monomers having from 3 to about 8 carbon atoms. The ethylene content of the copolymer, i.e. that portion attributible to ethylene monomer, will preferably comprise at least about 80% by weight of the copolymer.

The methods employed to form the polymers useful herein are not critical to the success of this invention and will be well known to those skilled in the art. In general, with respect to ethylene homopolymers and copolymers of ethylene with acrylic acid and acrylic or vinyl esters, it has been found preferable to use conventional high pressure and high temperature techniques to carry out the polymerization. When copolymers of ethylene with other olefinic monomers are desired, the well-known low pressure polymerization techniques have been found useful.

The polymeric films or sheets formed of these resins may likewise be produced by conventional means, such as extrustion thru a slot die or by casting techniques. The important consideration with regard to the film or sheet material, beyond the ethylene content of the polymer, is that the density thereof be controlled to come within the approximate range of 0.915 to 0.935 g/cm$^3$. Since there is a definite known relationship between the degree of crystallinity and the density of polyethylene, it is convenient to control the density by exercising control over the level of crystallization of the polymer. One method of accomplishing this is to control the molecular structure of the polymer. Since crystallinity in polyethylene is primarily a function of the number of branches along the polymer chain, one may, for instance, introduce more side chains and thereby decrease crystallinity. Or conversely, one may conduct the reaction of the monomers such that relatively fewer branches are formed and thereby produce a polymer which is more crystalline.

The rate of cooling will also effect the crystallinity of extruded or cast films of polyethylene. A film which undergoes very gradual cooling or annealing from the melt will have a relatively higher crystalline content, and hence higher density, than an otherwise identical film which has been rapidly quenched after formation. These relationships and their utilization to manipulate the physical character of polyethylene products are known to those skilled in the art. A more detailed discussion is to be found in the article on Ethylene Polymers in Vol. 6 of the *Encyclopedia of Polymer Science And Technology*, N.M. Bikales executive editor, published by Interscience Publishers (John Wiley & Sons, Inc.), the entire contents of which are incorporated herein by reference.

We have found that the low density polyethylene film, as characterized above, either in the form of a continuous web or in discrete sheets, may be stretched in a single direction to derive all of the known and beneficial effects of orientation in that direction without loss of properties, as exemplified by the tear strength, in the transverse direction. Such improvement is desirably accomplished by stretching the film at a temperature below its crystalline melting point and preferably above the glass transition temperature (Tg). The preferred stretching temperatures will fall within the approximate range of 70° C. to about 5° C. below the melting point of the polymer.

The degree of film elongation (stretch) may be from about 50% to about 700% of its original length without significant deterioration of transverse properties. Preferably, while the film is being stretched in one direction (e.g., along its length), the direction at right angles (its "width") is held fixed by mechanical means to prevent necking-down or narrowing of the film.

Films stretched according to this invention are found to have higher clarity, higher strength and approximately equal or better impact strength and transverse tear resistance than a film made from the same resin by conventional film blowing technique. It has been found that polyethylene films treated in this manner are useful and desirable in the fabrication of plastic bags having superior strength and also in manufacturing of film suitable for shrink bundling and shrink wrap uses.

The following examples are presented to illustrate the general concept disclosed herein and to demonstrate the advantage to be obtained by practice of this invention.

EXAMPLE 1

A low density polyethylene film having a nominal thickness of 4 mil was prepared from conventional polyethylene resin (MI=2; density=0.920 g/cm$^3$) by blowing a film on a 3.5" blown film line. The film was then stretched on a Marshall & Williams Co. Model #8000 longitudinal stretcher by inserting the flat film at 20 feet/minute, passing it over rollers which were heated to about 99° C. (210° F.), and drawing the heated film off at 3X, 3.5X, 4X and 5X the feed rate to obtain various orientation levels. The uniaxially oriented film was then tested for strength, shrinkage and optical properties in both the direction of orientation and the transverse direction. The test methods are given in Table I and the results are shown in Tables II, III and IV.

TABLE I

| Test | ASTM Method |
| --- | --- |
| Elastic Modulus | D-882 |
| Yield Strength | D-882 |
| Ultimate Strength | D-882 |
| % Elongation at Yield | D-882 |
| Impact Resistance | D-256 |
| Propagation Tear Resistance | D-1922 |
| Shrinkage | D-2932 |
| Contractural Orientation Force | D-2838* |
| Haze | D-1003 |
| Gloss | D-2457 |

*Modified to provide heating with a heater and air system.

TABLE II

PHYSICAL PROPERTIES OF LDPE FILM

| | | CONVENTIONAL SHRINK FILM[1] | BLOWN FILM CONTROL[2] | UNIAXIAL STRETCH RATIO | | | |
| --- | --- | --- | --- | --- | --- | --- | --- |
| | | | | 3.0X | 3.5X | 4.0X | 5.0X |
| ELASTIC MODULUS, PSI | D.O.S.[3] | 24,000 | 25,150 | 31,111 | 32,377 | 54,494 | 56,024 |
| | T.D.[4] | 32,000 | 30,200 | 48,162 | 52,000 | 56,667 | 61,310 |
| YIELD STRENGTH, PSI | D.O.S. | 1,400 | 1,541 | 6,803 | NONE | NONE | NONE |
| | T.D. | 1,400 | 1,578 | 2,052 | 2,176 | 2,133 | 2,274 |
| ULTIMATE STRENGTH, PSI | D.O.S. | 3,000 | 2,515 | 7,239 | 7,459 | 11,146 | 11,084 |
| | T.D. | 2,500 | 1,787 | 2,279 | 2,200 | 2,166 | 2,274 |
| % ELONGATION | D.O.S. | 400 | 136.0 | 97.5 | 108.0 | 62.0 | 76.0 |
| | T.D. | 570 | 418.0 | 650.0 | 564.0 | 528.0 | 541.0 |
| IMPACT RESISTANCE, foot-pounds/inch | | 310 | 76.5 | 73.5 | 60 | 74 | 82 |
| PROPAGATION TEAR RESISTANCE, gms. | D.O.S. | 54 | 262 | 213 | 210 | 167 | 148 |
| | T.D. | 64 | 147 | 241 | 233 | 203 | 192 |
| GAUGE, MILS | | 3 | 1.40 | 1.35 | 1.23 | 0.89 | 0.83 |

Notes:
[1]Conventional LDPE Blown Film; MI = 0.2; density = 0.917–0.922 g/cm$^3$
[2]Film Blown on 30mm line at 1.8/1 Blow-up ratio
[3]D.O.S. = Direction of Stretch
[4]T.D. = Transverse Direction (at right angles to stretch)

TABLE III

LDPE DIRECTIONAL AND AREA SHRINKAGE

| DIRECT SHRINK (%) | CONVENTIONAL SHRINK FILM | UNIAXIAL STRETCH RATIO | | | |
| --- | --- | --- | --- | --- | --- |
| | | 3.0X | 3.5X | 4.0X | 5.0X |
| 89° C. D.O.S. | 0 | 19 | 13 | 13 | 16 |
| T.D. | 0 | 0 | 0 | 0 | 0 |
| TOTAL AREA | 0 | 5 | 3 | 3 | 4 |
| 90° C. D.O.S. | 0 | 38 | 22 | 19 | 19 |
| T.D. | 0 | 0 | 0 | 0 | 0 |
| TOTAL AREA | 0 | 9 | 6 | 5 | 5 |
| 100° C. D.O.S. | NIL | 50 | 40 | 38 | 41 |
| T.D. | NIL | 3 | 0 | 0 | 0 |
| TOTAL AREA | NIL | 52 | 10 | 9 | 11 |
| 110° C. D.O.S. | 50 | 81 | 81 | 78 | 75 |
| T.D. | 25 | 6 | 6 | 9 | 9 |
| TOTAL AREA | 37 | 82 | 82 | 80 | 77 |
| CONTRACTURAL ORIENTATION STRESS [1] | 95[2] | 644 | 621 | 714 | 800 |
| GAUGE, MILS | 3 | 1.35 | 1.23 | 0.89 | 0.83 |

Notes:
[1]HIGHEST STRESS BEFORE SAMPLE MELTS
[2]STRESS DUE TO SHRINKAGE ON RECRYSTALLIZATION

TABLE IV

Optical Properties of LDPE Film

| | | Gloss | |
| --- | --- | --- | --- |
| Sample | Haze, % | D.O.S. | T.D. |
| Conventional Shrink Film | 10 | 50 | 50 |
| Blown Film Control | 14 | 45 | 45 |
| Uniaxial Stretch Ratio: | | | |
| 3.0X | 6.3 | 54 | 65 |
| 3.5X | 6.8 | 56 | 56 |

TABLE IV-continued

| | Optical Properties of LDPE Film | | |
|---|---|---|---|
| | | Gloss | |
| Sample | Haze, % | D.O.S. | T.D. |
| 4.0X | 4.4 | 75 | 75 |
| 5.0X | 5.0 | 73 | 73 |

As will be seen from the data in Table II, the physical properties which reflect the strength of the uniaxially stretched film increased in the direction of film orientation (D.O.S.), as expected. The amount of increase in each case depended upon the degree of stretch and the specific test involved. Surprisingly, however, the strength in the transverse direction (T.D.) was also increased significantly, in most cases providing properties which were equal or superior to those of a conventional shrink film having a nominal thickness (3 mils) which was up to 3.6 times greater than that of the uniaxially stretched film.

Table III sets out the shrinkage characteristics of the uniaxially stretched films of Example I as compared to a conventional shrink film. The conventional shrink film had to be heated to 110° C. before significant shrinkage took place, and even then a very significant proportion of the total film shrinkage was the result of transverse shrinkage. In contrast, the films of the present invention could be induced to shrink at much lower temperatures, thereby resulting in a significant potential savings in terms of energy input required. Also, with respect to the films of this invention, almost the entire amount of the total area reduction was a result of shrinkage in only one direction, indicating that this would be a highly desirable material to use in certain shrink-wrap applications such as sleeve wrap and bundling, pallet wraps, and so forth.

EXAMPLE 2

To demonstrate the effect of resin density on the tear strength of uniaxially oriented polyethylene film, a range of commonly available polyethylene resins were tested. The resins were as follows:

HDPE: an ethylene-butene high density polyethylene copolymer prepared by organometallic catalysis; density 0.950 g/cm$^3$; 1.2 MI.

MDPE: an ethylene-butene intermediate density copolymer prepared by organometallic catalysis; density 0.935 g/cm$^3$; 2.8 MI.

LDPE:
 (A) conventional low density polyethylene homopolymer prepared by the high temperature-high pressure process; density 0.918 g/cm$^3$; 2.0 MI.
 (B) an ethylene-butene copolymer prepared by organometallic catalysis; density 0.927 g/cm$^3$; 2.0 MI.

Each of these resins was prepared into a molded film by compression molding in a square frame, at 190.5° C. (375° F.) and 55,000 psig pressure, to make plaques which measured 12"×12" and were 5 mils in thickness. These films were used directly as the control samples in the tear resistance determinations.

Using the same procedure as above, a second set of film plagues having a thickness of 10 mils were prepared. These were cut into 2"×4" strips for stretching. Stretching was carried out in a heated chamber at temperatures as follows:

| Resin | Chamber Temp. |
|---|---|
| HDPE | 124° C. (155° F.) |
| MDPE | 121° C. (250° F.) |
| LDPE | |
| (A) | 103° C. (218° F.) |
| (B) | 116° C. (240° F.) |

Stretching was accomplished by holding the 4" dimension fixed and drawing the heated strip along the 2" dimension to a length of 14 inches (7X; 600% stretch). The elongated film strips were then removed from the chamber, allowed to cool to ambient temperature, and removed from the stretching device.

Each of the elongated strips and control film was then tested for resistance to tearing by ASTM Method D-1922 (Propagation Tear Resistance). The results are given in Table V.

TABLE V

| | Propagation Tear Resistance, g/mil | | | |
|---|---|---|---|---|
| | Control | | 600% Stretch | |
| Resin | D.O.S. | T.D. | D.O.S. | T.D. |
| HDPE | 62 | 65 | nil | 119 |
| MDPE | 111 | 104 | nil | 768 |
| LDPE | | | | |
| (A) | 168 | 163 | 307 | 222 |
| (B) | 392 | 308 | 245 | 1040 |

As will be seen, only the low density polyethylene films maintained their tear strength in the transverse direction after uniaxial orientation. The films made from the high and intermediate density resins had essentially no resistance to tearing in the transverse direction.

Having described our invention with reference to specific embodiments and examples, it is to be understood that modifications and variations may be resorted to without departing from the spirit and scope of this invention, as those skilled in the art will readily understand. Such modifications and variations are considered to be encompassed within the purview and scope of the claims which follow.

What is claimed is:

1. A uniaxially oriented thermoplastic film having improved film strength in the direction transverse to the direction of orientation, said film comprising low density polyethylene which has been stretched in a single direction at a temperature below its crystalline melting point, said low density polyethylene film being characterized by a density, prior to stretching, of within the approximate range of 0.915 g/cm$^3$ to 0.935 g/cm$^3$.

2. A uniaxially oriented thermoplastic film having improved film strength in the direction transverse to the direction of orientation, said film comprising an ethylene-containing polymer wherein the proportion attributable to ethylene comprises at least 80% by weight of said polymer, said film being further characterized by a density, prior to stretching, of within the approximate range of 0.915 g/cm$^3$ to 0.935 g/cm$^3$.

3. A uniaxially oriented film in accordance with claim 2 wherein said ethylene-containing polymer is a copolymer of ethylene with other unsaturated monomers.

4. The film of claim 3 wherein said copolymer is a copolymer of ethylene with one or more members of the group of unsaturated monomers consisting of: acrylic acid, esters of acrylic acid, vinyl esters, and olefins having from 3 to about 8 carbon atoms.

* * * * *